(12) United States Patent
Divakaran

(10) Patent No.: US 9,930,490 B2
(45) Date of Patent: Mar. 27, 2018

(54) LOCATION BASED DYNAMIC BANDWIDTH ADJUSTMENT

(71) Applicant: International Business Machines Corporation, Armonk, NY (US)

(72) Inventor: Deepak E. Divakaran, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/082,097

(22) Filed: Mar. 28, 2016

(65) Prior Publication Data

US 2017/0280296 A1 Sep. 28, 2017

(51) Int. Cl.
*H04W 24/00* (2009.01)
*H04W 4/02* (2018.01)
*H04W 72/04* (2009.01)

(52) U.S. Cl.
CPC ......... *H04W 4/025* (2013.01); *H04W 72/048* (2013.01); *H04W 72/0446* (2013.01)

(58) Field of Classification Search
None
See application file for complete search history.

(56) References Cited

U.S. PATENT DOCUMENTS

| 6,631,118 | B1 | 10/2003 | Jones |
| 7,587,512 | B2 | 9/2009 | Ta et al. |
| 8,036,119 | B2 | 10/2011 | McEwen |
| 8,224,355 | B2 | 7/2012 | Beydler et al. |
| 8,363,562 | B2 | 1/2013 | Liu et al. |
| 2006/0187905 | A1* | 8/2006 | Manabe ............... H04L 12/4625 370/352 |
| 2011/0058036 | A1* | 3/2011 | Metzger ................. H04N 7/181 348/143 |
| 2012/0120818 | A1* | 5/2012 | Lientz ................. H04L 41/0896 370/252 |
| 2013/0252583 | A1* | 9/2013 | Brown .................. H04W 12/06 455/411 |
| 2016/0227404 | A1* | 8/2016 | Kollu ..................... H04W 12/06 |
| 2016/0302140 | A1* | 10/2016 | Shaw .................... H04W 48/20 |

FOREIGN PATENT DOCUMENTS

WO 2004095160 A2 11/2004

OTHER PUBLICATIONS

Tayebi, "What is Bandwidth on Demand?", Ciena, Sep. 17, 2014, 9 pages, <http://www.ciena.com/connect/blog/What-is-Bandwidth-on-Demand.html>.

* cited by examiner

*Primary Examiner* — Suhail Khan
(74) *Attorney, Agent, or Firm* — Walter L. Rudberg; A. Imtiaz Billah

(57) ABSTRACT

Embodiments of the present invention provide a method, computer program product, and a computer system for dynamically adjusting bandwidth based on location. At least one computing device, utilizing a network bandwidth, associated with a user is registered at a first location. The location of the at least one computing device is tracked by detecting whether the at least one computing device is at the first location. Upon detecting a change in location, it is determined whether a change in the amount of the network bandwidth is required, based, at least in part on, a set of rules and a current location of the at least one computing device. If a change in the amount of network bandwidth is required, a request is made to the internet provider to adjust the current amount of network bandwidth to the at least one computing device.

20 Claims, 5 Drawing Sheets

FIG. 4A

| Device ID | Current Location | Event | Rule ID | BW on Miss | BW on Enter |
|---|---|---|---|---|---|
| Dependent Computing Device 335C | Outside | Entry | Any Independent Inside | Bandwidth Low | Bandwidth High |
| Dependent Computing Device 335C | Inside | Exit | Only Dependent Inside | Bandwidth High | Bandwidth Low |
| Dependent Computing Device 335D | Outside | Entry | Any Independent Inside | Bandwidth Low | Bandwidth High |
| Dependent Computing Device 335D | Inside | Exit | Only Dependent Inside | Bandwidth High | Bandwidth Low |
| Independent Computing Device 335A | Outside | Entry | Always True | Bandwidth Low | Bandwidth High |
| Independent Computing Device 335A | Inside | Exit | Only Dependent Inside | Bandwidth High | Bandwidth Low |
| Independent Computing Device 335B | Outside | Entry | Always True | Bandwidth Low | Bandwidth High |
| Independent Computing Device 335B | Inside | Exit | Only Dependent Inside | Bandwidth High | Bandwidth Low |

FIG. 4B

| Rule | Definition |
|---|---|
| Any_Independent_Inside | If ((COUNT_OF (Device_ID, where Member_Type=Independent and Current_Location=Inside) > 0) Return true; Else Return false; |
| Only_Dependent_Inside | If ((COUNT_OF (Device_ID, where Member_Type=Independent and Current_Location=Inside) = 0 && (COUNT_OF (Device_ID, where Member_Type=Dependent and Current_Location=Inside) > 0)) Return true; Else Return false; |
| Always_True | return true; |

LOCATION BASED DYNAMIC BANDWIDTH ADJUSTMENT

BACKGROUND OF THE INVENTION

The present invention relates generally to the field of networks, and in particular to dynamically adjusting bandwidth to a desired level based on user locations and a set of rules.

Communication through a network has become an essential means of communication for individuals, families, and organizations. The Internet is a global network connecting countless computing devices, using a client-server style architecture. The Internet allows computing devices to send and receive data. Generally a user accesses the Internet through an Internet Service Provider ("ISP") or a local area network ("LAN") connection. Routers and switches direct data traffic between the various ISPs. Electronic devices such as smart phones and personal computers, and the like, often have a means of connecting to the Internet which allows users to easily exchange data over the Internet. A device's access to the Internet is limited by the maximum bandwidth allowed by the ISP.

Bandwidth is the amount of data that is carried from one point to another over a given period of time between computers connected through a network, known as a data transfer rate. Network bandwidths are usually expressed in bits per second (bps).

SUMMARY

According to one embodiment of the present invention, a method for location based dynamic bandwidth adjustment is provided, the method comprising: registering, by one or more processors, at least one computing device wherein the at least one computing device is associated with a user at a first location, and wherein the at least one computing device utilizes a network bandwidth; tracking, by one or more processors, a location of the at least one computing device, wherein tracking the location of the at least one computing device further comprises: detecting, by one or more processors, whether the at least one computing device is at the first location; determining, by one or more processors, whether a change in the amount of the network bandwidth is required, based at least in part on, a set of rules and a current location of the at least one computing device; and responsive to determining that a change in the amount of network bandwidth is required, requesting, by one or more processors, said change in the current amount of network bandwidth.

Another embodiment of the present invention provides a computer program product for location based dynamic bandwidth adjustment, based on the method described above.

Another embodiment of the present invention provides a computer system for location based dynamic bandwidth adjustment, based on the method described above.

BRIEF DESCRIPTION OF THE DRAWINGS

FIG. 4A and FIG. 4B are tables depicting exemplary rules for a rules engine, in accordance with an embodiment of the present invention.

DETAILED DESCRIPTION

Figure 1:
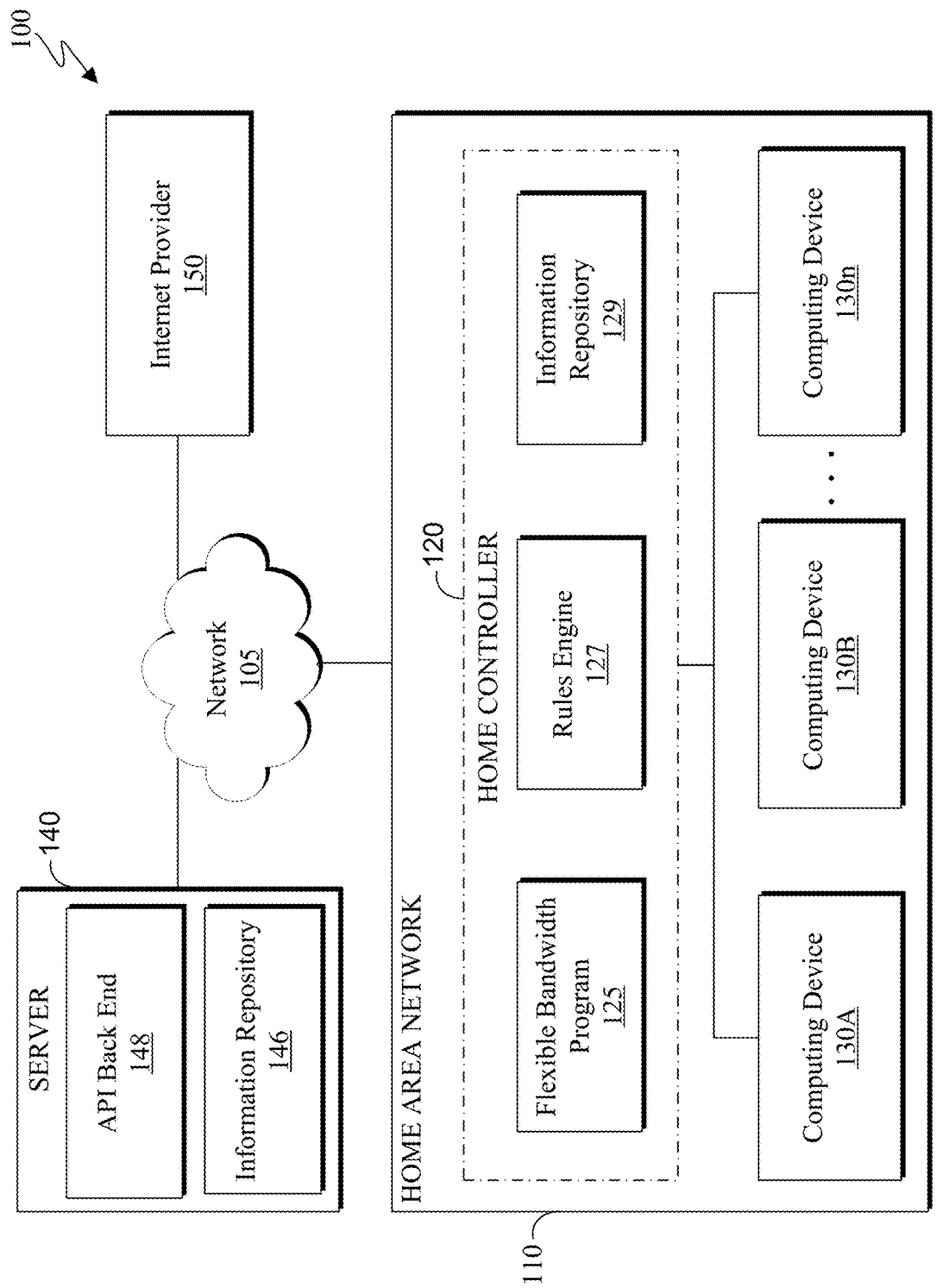
FIG. 1 is a functional block diagram illustrating a data processing environment, in accordance with an embodiment of the present invention.

Computing devices have become an essential part of daily life. Advances in electronic technology allow for near instantaneous communication and data exchange. Many devices possess 'smartness' features which enable such devices to receive and send information over a network. Additionally, many smart devices provide a user with access to computing capabilities even as the user moves about to various locations.

Bandwidth as used herein, encompasses an amount of data that can be transmitted in a fixed amount of time. Data plans, as provided by a telecommunication provider, often are limited to a specific bandwidth. When a consumer subscribes to a data plan, the consumer chooses a bandwidth based on the consumer's estimated maximum requirement. However, often the consumer does not use the entirety of the bandwidth provided for in the data plan, but is obligated to pay for unused bandwidth; similarly, the telecommunication provider is obligated to provide such bandwidth. For example, different applications require different bandwidths, an instant messaging conversation may take 1,000 bps, while high definition ("HD") video requires around 4 Mbps. Therefore, if a user normally uses only instant messaging, but occasionally watches an HD video, the user must subscribe, from the telecommunication provider, for bandwidth to accommodate an HD video even though the user does not continually watch HD videos.

Embodiments of the present invention provide systems and methods to automatically utilize the location of a user (based on the location of a computing device associated with the user), and applicable rules of hierarchy and relationships between users within the governed system, to determine a required bandwidth. Further, embodiments of the present invention derive different user activities that directly and/or indirectly relate to the required bandwidth of the user.

Software defined networking is an approach used by telecommunications providers which provides for a more intimate conveyance of bandwidth. Specifically, under a software defined network, bandwidth may be considered on-demand bandwidth, by providing flexible bandwidth as needed to consumers.

Embodiments of the present invention provide systems and methods to determine when bandwidth should be increased or decreased based on predefined rules as set by a user. For example, a rule may include establishing dependencies and relationships between bandwidth consuming devices belonging to the user and his relations. Additionally, embodiments of the present invention provide systems and methods to automatically request additional bandwidth from the telecommunications provider. For example, additional bandwidth may be requested based on an occurrence of a specific instance. In another example, additional bandwidth may be requested based on an occurrence of a variety of scenarios.

Additionally, embodiments of the present invention provide the capability to aggregate the data of each user and provide real time action in administrating the required bandwidth for all users. Also, embodiments of the present invention provide a system and method that may self-learn and utilize pre-defined rules, while maintaining a manual aspect to control the amount of bandwidth provided to the collection of computing devices.

The present invention will now be described in detail with reference to the Figures. FIG. 1 is a functional block diagram illustrating a data processing environment ("environment"), generally designated 100, in accordance with an embodiment of the present invention. FIG. 1 provides only an illustration of one embodiment and does not imply any limitations with regard to the environments in which different embodiments may be implemented. Many modifications to the depicted environment may be made by those skilled in the art without departing from the scope of the invention, as recited by the claims.

In the depicted embodiment, environment 100 includes Internet provider 150, server 140 and home area network 110, which contains, home controller 120 and at least one computing device (i.e., computing device 130A, computing device 130B and/or computing device 130n), all interconnected over network 105.

Network 105 may be a local area network ("LAN"), a wide area network ("WAN"), such as the Internet, the public switched telephone network ("PSTN"), a mobile data network (e.g., wireless Internet provided by a third or fourth generation of mobile phone mobile communication), a private branch exchange ("PBX"), any combination thereof, or any combination of connections and protocols that will support communications between home area network, 110, server 140, and internet provider 150.

Similar to network 105, home area network ("HAN") 110 may be a computer network with a small geographic scope. Computer networks with a small geographic scope range from NFC to LAN's. A computer network with a small geographic scope may have a connection to the Internet or other remote networks. HAN 110 can be used for communication among mobile devices themselves (intrapersonal communication) or for connecting to a higher level network (e.g., the Internet). A wireless personal area network ("WPAN") may be considered a HAN carried over wireless network technologies such as Bluetooth® or peer-to-peer communications over a wireless LAN (Bluetooth is a registered trademark of Bluetooth SIG, Inc.). In embodiments of the present invention, computing devices device 130A, 130B, . . . , 130n and home controller 120 each have the necessary hardware to allow for communication over any preconfigured type of HAN 110 used for communication between them (e.g., a Bluetooth radio), and/or the Internet at large. HAN 110 may be located, for example, in a home, in a personal vehicle, in an office building, etc. In an embodiment, (not shown in environment 100) more than one HAN 110 may be implemented, where each HAN 110 possesses its own home controller 120.

Computing devices 130A, 130B and 130n, respectively (130A-n) may be any electronic computing device capable of communication and data exchange, and capable of communicating with home controller 120 within HAN 110 as well as the internet. For example, computing devices 130A-n include, but is not limited to, cellular phones, smart phones, mobile phones, Wi-Fi phones, wearable computing devices, laptop computers, tablet computers, desktop computers, handheld computers, netbooks, personal organizers, e-reading devices, and the like. For example, computing devices 130A-n may be smart watches, capable of detecting various inputs and transmitting data to home controller 120. Computing devices 130A-n, may, while within the proximate vicinity of HAN 110, recognize home controller 120.

Each computing device 130A-n may be associated with one user (not shown). For example, computing devices 130A-n may be associated with users who have different permission levels as controlled by home controller 120. For instance, computing device 130A may be designated as an independent device, giving the user a high level of authority, while computing devices 130B-n may be designated as dependent devices, yielding a limited level of authority to other users. Within the scope of the present invention, specific levels of authority may relate to manually controlling bandwidth. In an example, computing devices 130A-n may be associated with specific users, and based on each computing devices 130A-n's location, bandwidth may increase or decreased per a predetermined set of rules.

Computing devices 130A-n may include a variety of sensors. For example, sensors may include a location determining sensor (e.g., GPS), proximity sensors, light sensors, thermometers, atmospheric sensors, etc. Sensors associated with computing devices 130A-n may assist in determining location or a location change of each respective device. Additionally computing devices 130A-n may include a user interface (not show). The user interface may include a graphical user interface. Computing devices 130A-n may have a user interface allowing a user to establish rules on when to increase/decrease bandwidth.

Computing devices 130A-n may be a simple device with the ability to be connected and/or paired with a larger computing device (i.e., a device with the ability to process more bandwidth). For example, computing device 130A may be a simple wearable device which notifies home controller 120 if the wearable device is in proximity to HAN 110. Therefore, based on the location of wearable device (i.e., computing device 130A), flexible bandwidth program 125 may request an increase or decrease of bandwidth to the Internet.

In an embodiment, computing devices 130A-n may leverage other devices external to the computing devices 130A-n such as a mobile phone or a personal computer. For example, based on the location of computing device 130A, computing device 130A may request through flexible bandwidth program 125, an increase or decrease in bandwidth to a user(s) external device, e.g., a laptop computer for streaming a video, viewing a live security camera feed from a remote location.

Home controller 120 may be any electronic computing device capable of communication and data exchange, and capable of communicating with computing devices 130A-n and network 105. In an embodiment home controller 120 may contain a rules engine (similar to rules engine 127) to contain a set of rules for increasing and decreasing the bandwidth. In an embodiment, home controller 120 may contain an information repository (similar to information repository 129) to hold information such as, family members, their respective devices, location of devices and the type of device (i.e., whether the device is independent or dependent), etc.

Home controller 120, may represent a router, modem computer or other devices known in the art. Home controller 120 may communicate with server 140, through network 105.

Home controller 120 includes flexible bandwidth program 125, rules engine 127, and information repository 129. Through the combination of components, described in detail below, home controller 120 may create HAN 110 in order to determine if one or more computing devices 130A-n are within HAN 110. Further, home controller 120 may register computing devices 130A-n. For example, home controller

120 may provide computing devices 130A-n with their own unique device identification ("I.D."). Additionally, home controller 120 may have a user interface allowing a user to establish rules on when to increase/decrease bandwidth. Home controller 120 may also be configured with API's, provided by the telecommunication provider, for the corresponding bandwidth change. For example, home controller 120 may invoke an API provided by the telecommunication company for a change in bandwidth. In an embodiment, home controller 120 may track the location of computing devices 130A-n.

Flexible bandwidth program 125 on home controller 120 determines, based on various conditions, the amount of bandwidth to request from Internet provider 150 available to disburse to computing devices 130A-n. In an alternative embodiment, flexible bandwidth program 125 is located in server 140. Flexible bandwidth program 125 may allow for conditions outside Internet provider 150 to influence the on-demand bandwidth delivered to computing devices 130A-n. Various conditions and/or rules, based on rules engine 127 and/or information repository 129 may trigger flexible bandwidth program 125 to request via an API a change in bandwidth from the telecommunication provider. For example, conditions which may trigger flexible bandwidth program 125 to request a change in bandwidth may depend on the Internet of Things ("IoT")/Machine to Machine ("M2M") due to interactions between home controller 120 and computing devices 130A-n associated with a user.

In various embodiments of the present invention, flexible bandwidth program 125 receives various data, for example geographic location of each computing devices 130A-n, and determines how to optimize the bandwidth required to operate each of the computing devices. For example, flexible bandwidth program 125 may request different bandwidth for each computing device 130A-n. Alternatively, flexible bandwidth program 125 may request the same bandwidth for each computing device 130A-n.

In an embodiment of the invention, flexible bandwidth program 125 primarily determines a predicted bandwidth amount for computing devices 130A-n, based on information received from peripheral components (i.e., home controller 120, rules engine 127 and information repository 129) and the respective locations of each computing device 130A-n. Flexible bandwidth program 125 may associate computing devices 130A-n with different classes of persons. For example, in a family setting, computing device 130A is associated with a parent user while computing device 130B is associated with a child user. The different classes of computing devices 130A-n may provide more control to manually manipulate flexible bandwidth program 125 in order to manually request more or less bandwidth.

Flexible bandwidth program 125 may contain a manual override feature which allows computing devices 130A-n to manually change the bandwidth. For example, computing device 130A may manually request a change in bandwidth.

Flexible bandwidth program 125, based on an evaluation of rules from rules engine 127, may determine that a change in bandwidth is required. If flexible bandwidth program determines a change in bandwidth is required, flexible bandwidth program 125 will initiate an API to Internet provider 150, (for example, a telecommunication company) for the bandwidth change. For example, home controller 120 will invoke the API on a telecommunication company broker application (not shown in FIG. 1). The broker application will then pass the instructions to a Software Defined Network Controller (SDN) (not shown in FIG. 1), which will configure the network for providing the changed bandwidth.

Flexible bandwidth program 125 may derive a pattern based on the bandwidth usage of computing devices 130A-n. For example, flexible bandwidth program 125 may analyze information received from home controller 120, rules engine 127 and information repository 129, and detect usage patterns of bandwidth usage. For instance, flexible bandwidth program 125 may detect repetitive peak bandwidth usage times, or minimal bandwidth usages, based on a variety of factors. Such factors may include, but are not limited to, time, day, and computing device 130A-n location. Based on a determined pattern, flexible bandwidth program 125 may anticipate a change in bandwidth consumption and request a change of bandwidth from Internet provider 150, prior to a computing device 130A-n needing the additional bandwidth. For example, flexible bandwidth program 125 may create a rule in rules engine 127 to request a change in bandwidth prior to one being needed, based on a derived pattern.

Rules engine 127 on home controller 120 may contain various predefined rules and/or user generated rules to manage the required bandwidth at a given time for computing devices 130A-n. Rules engine 127 may be located within home controller 120 (as depicted), server 140 or other locations known in the art. Rules engine 127 may have rules generated by a user to determine the amount of bandwidth required based on specific pre-determined events. Rules engine 127 may have a user generated rule to increase bandwidth based on a specific location of a user. Similarly, rules engine 127 may have a user generated rule to increase bandwidth based on the absence of a user from HAN 110. Rules engine 127 may also have rules generated by Internet provider 150.

Rules engine 127 may create rules by based on flexible bandwidth program 125 deriving various patterns from computing devices 130A-n of bandwidth usages. For example, upon flexible bandwidth program 125 deriving a bandwidth consumption pattern of use of computing device 130A-n, rules engine 127 may create a set of rules to control the amount of bandwidth based on the derived pattern. Alternatively, rules engine 127 may create rules by based rules engine 127 deriving a bandwidth usage pattern.

Information repository 129 may include any suitable volatile or non-volatile computer readable storage media, and may include random access memory ("RAM") and cache memory (not depicted in FIG. 1). Information repository 129 may be located within server 140 (as depicted), home controller 120 or other locations known in the art. Flexible bandwidth program 125 may be stored in a persistent storage component (not depicted) for execution and/or access by one or more of processor(s) via one or more memories (for more detail refer to FIG. 5). Alternatively, or in addition to a magnetic hard disk drive, the persistent storage component can include a solid state hard drive, a semiconductor storage device, read-only memory ("ROM"), erasable programmable read-only memory ("EPROM"), flash memory, or any other computer readable storage media that is capable of storing program instructions or digital information.

Information repository 129 can be implemented using any architecture known in the art such as, for example, a relational database, an object-oriented database, and/or one or more tables. Information repository 129 stores rules contained within rules engine 127. Information repository 129 may store information received from computing devices 130A-n. Information repository 124 may contain lookup tables, databases, charts, graphs, functions, equations, and the like that flexible bandwidth program 125 may access to maintain a specific bandwidth parameter. Information stored in information repository 129 may include: various geographical locations and various user patterns, in order to increase efficiency of determining the optimum bandwidth needed for the set of users. While depicted on home controller 120, in the exemplary embodiment, information repository 129 may be on a remote server or a "cloud" of computers interconnected by one or more networks utilizing clustered computers and components to act as a single pool of seamless resources, accessible to flexible bandwidth program 125 via network 105.

In the exemplary embodiment, server 140 is a server computer. In other embodiments, server 140 may be a management server, a web server or any other electronic device capable of receiving and sending data. In another embodiment, server 140 may represent a server computing system utilizing multiple computers as a server system, such as in a cloud computing environment. Server 140 may be hosted by Internet provider 150, a $3^{rd}$ party, and/or another means known in the art. Server 140 contains API Backend 148 and information repository 146.

API backend 148 is an application programming interface providing a backend for Internet provider 150 to control the change in bandwidth. For example, API backend 148 specifies how different software components may interact with each other, thereby enabling the sharing of data. API backend 148 may act as a broker between flexible bandwidth program 125 Internet provider 150, when flexible bandwidth program 125 issues a change bandwidth request.

Information repository 146 on server 140 may be utilized by Internet provider 150 and/or flexible bandwidth program 125 in controlling bandwidth to home controller 120. Information repository 146 may be utilized by Internet provider 150 to manage bandwidth for computing devices 130A-n. Information repository 146 may be structured similarly to information repository 129.

Internet provider 150 may create a separate rules engine (not shown) containing various predefined rules and/or user generated rules to manage bandwidth for computing devices 130A-n. For example, a rules engine in a server that is utilized by Internet provider 150, may allow Internet provider 150 to configure the correct ports etc. in order to provide the bandwidth requested by flexible bandwidth program 125.

Figure 5:
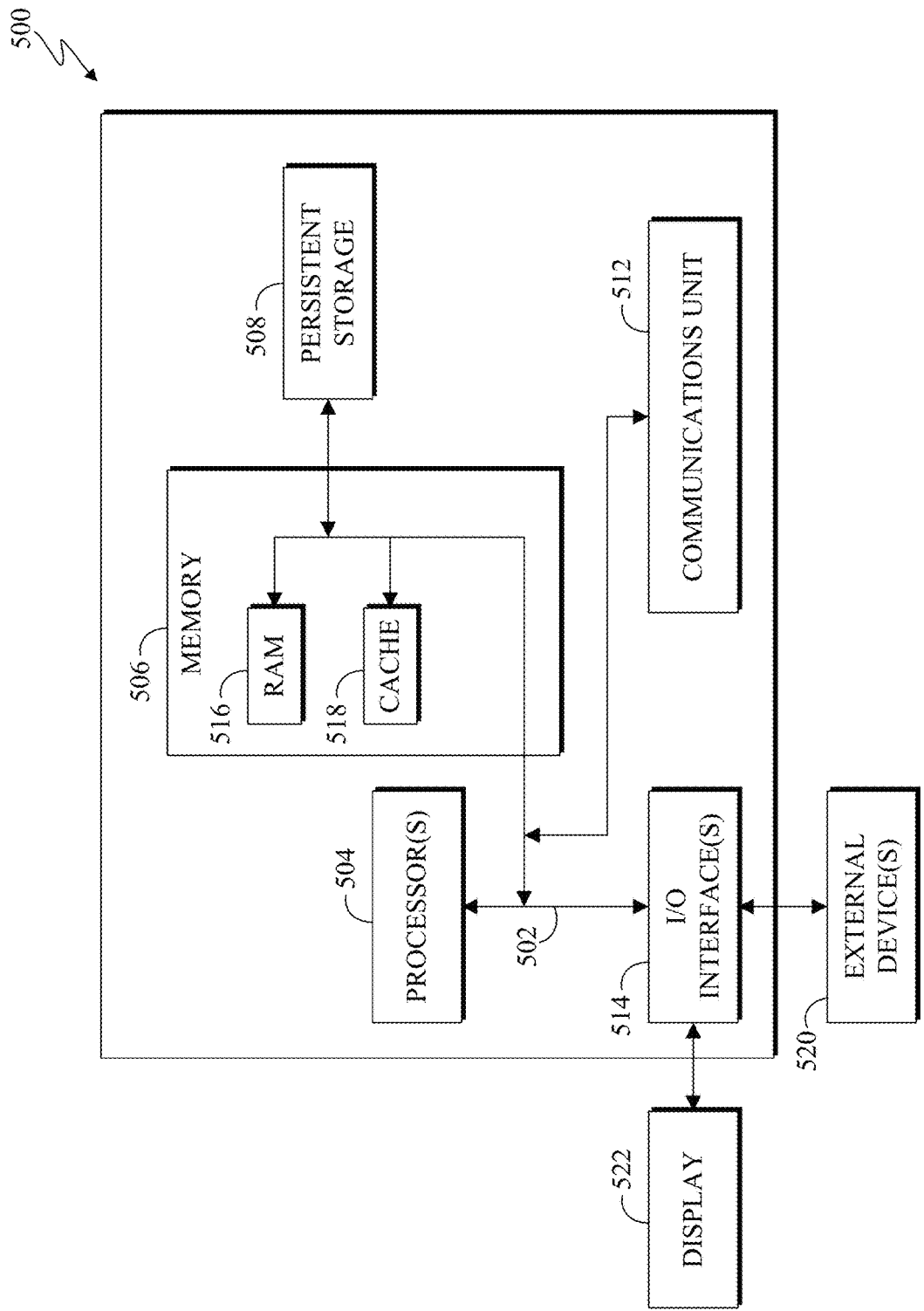
FIG. 5 is a block diagram of the internal and external components of a computer system, in accordance with an embodiment of the present invention.

Computing devices 130A-n, home controller 120, and server 140 may each include components as depicted in further detail with respect to FIG. 5.

Internet provider 150 represents a telecommunication provider, providing Internet access and bandwidth to the router containing the HAN 110 that is consumed by computing devices 130A-n. HAN 110 is registered with Internet provider 150, and a specified bandwidth requirement is established. Internet provider 150 may publish APIs allowing flexible bandwidth program 125 to request a change in bandwidth.

Figure 2:
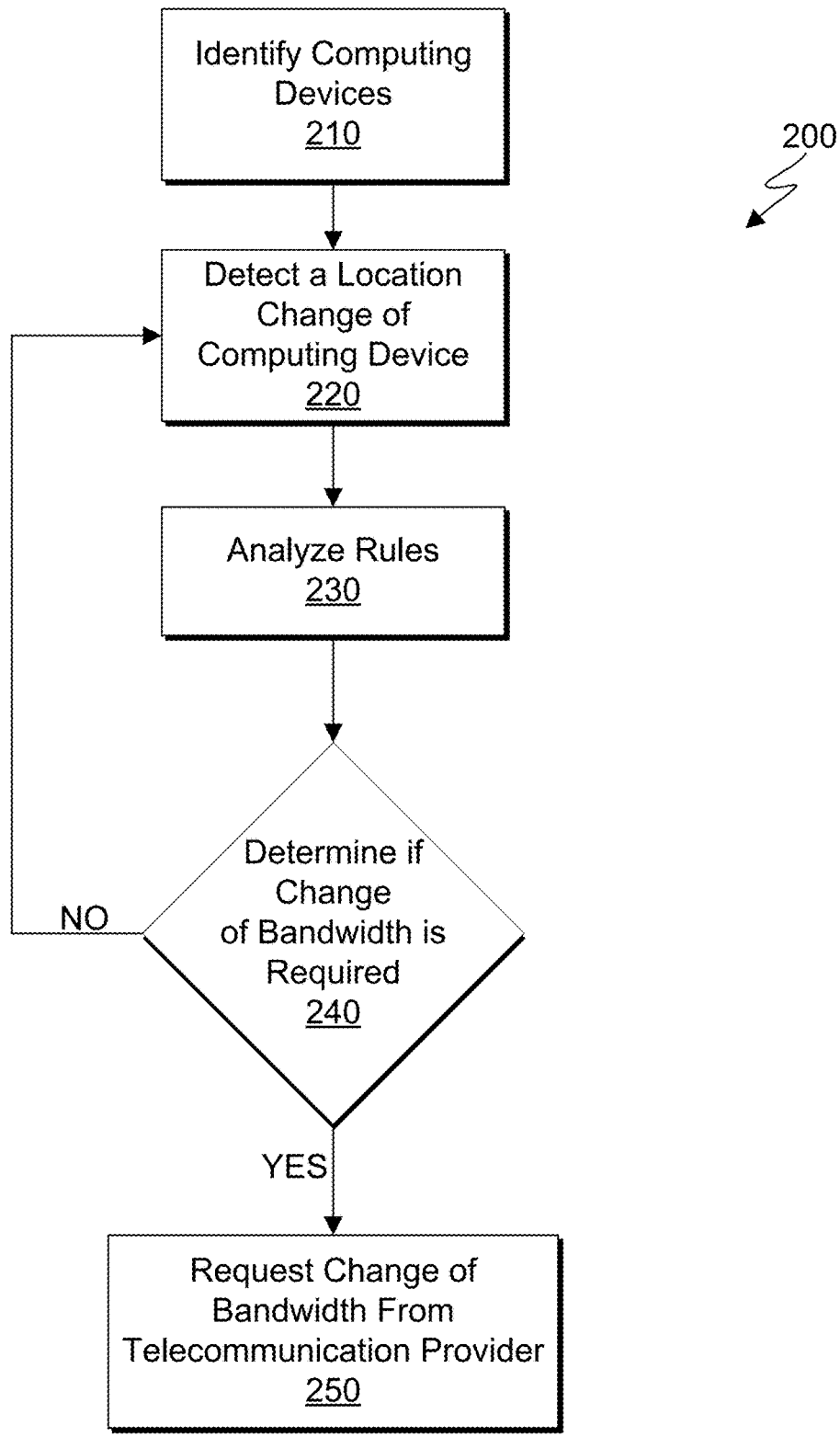
FIG. 2 is a flow chart illustrating operational steps of a flexible bandwidth program, in accordance with an embodiment of the present invention.

FIG. 2 depicts flowchart 200 illustrating operational steps of flexible bandwidth program 125, in accordance with an embodiment of the present invention.

In step 210, flexible bandwidth program 125 identifies the computing devices 130A-n, through home controller 120. Flexible bandwidth program 125 using home controller 120, institutes an initial setup between Internet provider 150 (telecommunication company) and HAN 110. The initial setup between flexible bandwidth program 125 and Internet provider 150 requires the users to register for a flexible bandwidth plan. Alternatively, the initial setup between flexible bandwidth program 125 and Internet provider 150 requires the users to currently have a flexible bandwidth plan. The users may specify with Internet provider 150 a regular bandwidth demand and a special case bandwidth demand, where the special case bandwidth demand is a larger bandwidth demand.

Further, in step 210, flexible bandwidth program 125 allows users to register computing devices 130A-n into home controller 120. In an embodiment of the present invention, the users may represent a family utilizing a data plan from Internet provider 150. In an alternative embodiment of the present invention, users may represent employees of a business, utilizing a data plan from Internet provider 150. Flexible bandwidth program 125 may allow computing devices 130A-n, associated with a specific user, to be classified into different groups. For example, if users are a family, flexible bandwidth program 125 may create independent family members (i.e., parents) and dependent family members (i.e., children). In an example, if the user is a business, flexible bandwidth program 125 may create different classifications of users. Therefore, each computing device 130A-n is configured to be associated with a specific user, and additionally, each computing device 130A-n may be configured to have a specific designation such as independent or dependent. Following the initial setup, flexible bandwidth program 125, is able to identify each computing device 130A-n.

In step 220, flexible bandwidth program 125 detects the location of computing devices 130A-n. Flexible bandwidth program 125 pairs each computing device 130A-n with home controller 120. Home controller 120 establishes HAN 110. HAN 110 is a computer network with a small geographic scope, for example, a specific room, a home or an office. Flexible bandwidth program 125 may detect when an identified computing device 130A-n (from step 210) enters or leaves the proximity of HAN 110. In an embodiment, home controller 120 detects when computing device 130A leaves HAN 110, or enters HAN 110. Home controller 120 may then notify flexible bandwidth program 125 of the change of location of a specific computing device 130A-n.

In step 230 flexible bandwidth program 125 analyzes rules from rules engine 127. When a change of location of a computing device 130A-n is detected (step 220), flexible bandwidth program 125 analyzes rules from rules engine 127. Flexible bandwidth program 125 analyzes rules engine 127 to identify if a rule requires a change in bandwidth.

In decision 240, flexible bandwidth program 125, determines if any applicable rules require a change in bandwidth. For example, flexible bandwidth program 125 may determine a rule requires a change in bandwidth based on a change of location of one or more computing devices 130A-n. For instance, if a rule requires a higher bandwidth each time independent computing device 130A leaves HAN 110, then flexible bandwidth program 125 moves to step 250.

If in step 240, it is determined that no change of bandwidth is required, then flexible bandwidth program 125, returns to step 220 to detect the next change of location of computing devices 130A-n. Flexible bandwidth program 125 may repeat the loop of steps 220, 230 and decision 240, until a change of bandwidth is required (per decision 240).

If in step 240, flexible bandwidth program 125 determines a change of bandwidth is required, then in step 250, flexible bandwidth program 125, requests a change in bandwidth from telecommunication provider (similar to internet provider 150, of FIG. 1). In an embodiment, flexible bandwidth program 125 may notify internet provider 150 to either increase or decrease the bandwidth to computing devices 130A-n. Those skilled in the art will appreciate there are many ways for flexible bandwidth program 125 to request a change in Internet bandwidth from internet provider 150.

Figure 3:
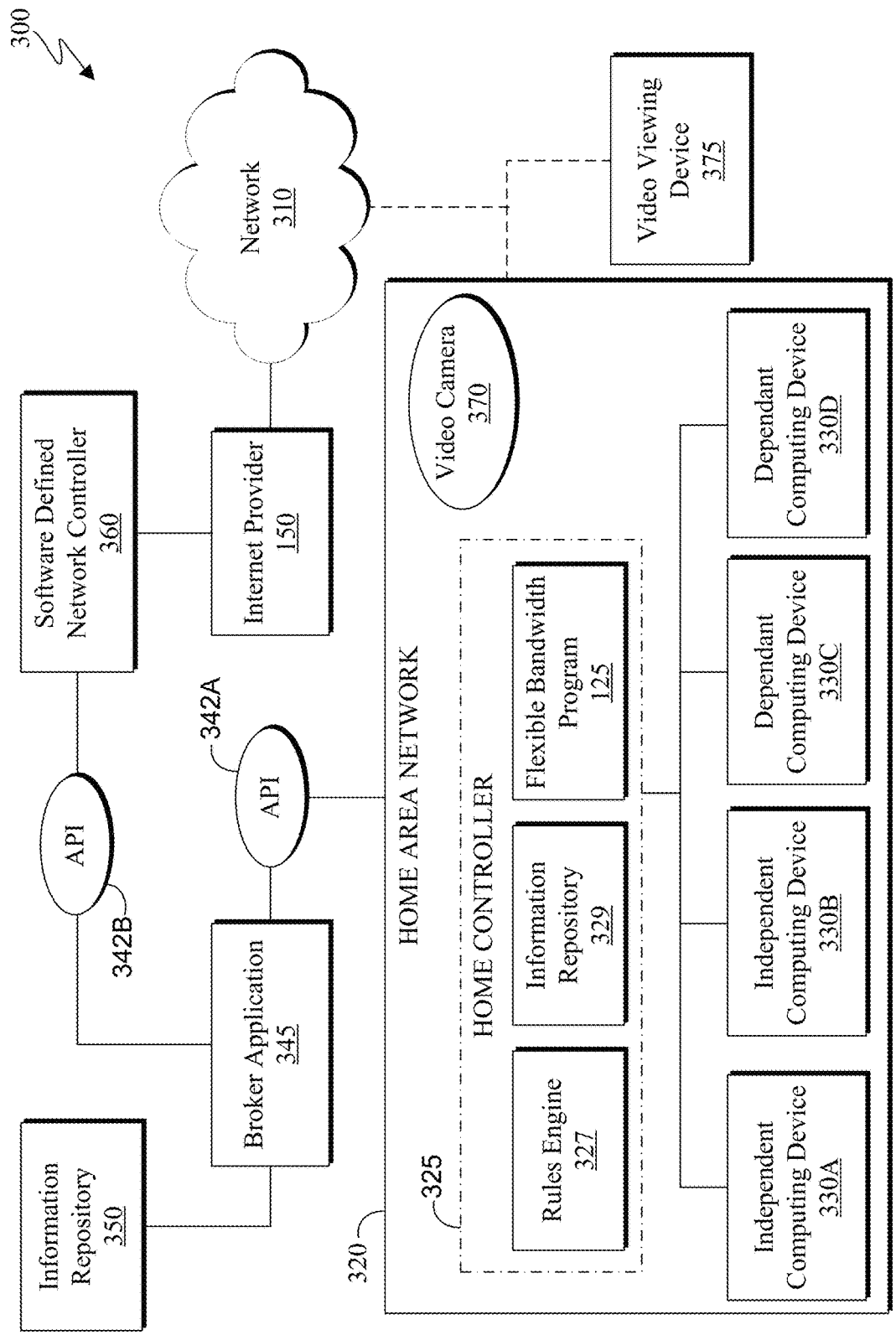
FIG. 3 is a functional block diagram illustrating an exemplary data processing environment, in accordance with an embodiment of the present invention.

Reference is now made to FIG. 3, FIG. 4A, and FIG. 4B. FIGS. 3, 4A, and 4B together depict an exemplary family utilizing an embodiment of the present invention. FIG. 3 is a functional block diagram illustrating an exemplary data processing environment ("environment"), generally designated 300, in accordance with an embodiment of the present invention. FIGS. 4A and 4B are tables depicting exemplary rules within rules engine 127, in accordance with an embodiment of the present invention.

In the depicted embodiment, environment 300 includes flexible bandwidth program 125, application program interface ("API") 342A and 342B, broker application 345, information repository 350, Software Defined Network ("SDN") Controller 360, internet provider 150, video viewing device 375, and home area network ("HAN") 320 which contains home controller 325, video camera 370, and independent computing devices 330A and 330B and dependent computing devices 330C and 330D, all interconnected over network 310. Home controller 325 includes rules engine 327, information repository 329 and flexible bandwidth program 125. Network 310, HAN 320, home controller 325 and computing devices 330A-D are similar to those of network 105, HAN 110, home controller 120 and computing devices 130A-n, respectively.

To illustrate an embodiment of the invention, the following scenario is used. A household is made of two independent persons (associated with independent computing devices 330A and 330B) and two dependent persons (associated with dependent computing devices 330C and 330D). For example, independent persons may represent a pair of parents and dependent persons may represent children. In this scenario, the household has the flexibility to establish rules for automating changes in bandwidth needs based on the location of each person at a given point in time.

Environment 300 depicts computing devices 330A-D paired to home controller 325, and are located within HAN 320. Video camera 370 represents a home monitoring system, and is also located within HAN 320. HAN 320 is connected to network 310. Video viewing device 375 may be an independent device or may be combined with independent computing device 330A and/or 330B. Video viewing device 375 is connected to network 310. Internet provider 150 controls the amount of bandwidth provided to computing devices 330A-330D and/or video viewing device 375.

Home controller 325 is associated with flexible bandwidth program 125. Home controller 325 has a rules engine 327, (similar to rules engine 127) and/or information repository 329 (similar to information repository 129). The information repository may contain information such as household members, computing devices of each household member, household member location and persons status (independent or dependent). Similarly, the rules engine may contain rules for increasing and decreasing bandwidth based on details from the information repository.

Home controller tracks the computing devices 330A-D as they enter or leave HAN 320. For example, when a computing device (i.e., computing device 330A) goes out of range of HAN 320, home controller 325 records the event as an exit. Similarly, when a computing device (i.e., computing device 330A) goes into range of HAN 320, home controller 325 records the event as an entrance. In another example, computing devices 330A-D may have a GPS chip, thereby allowing home controller 325 to determine the exact position of each computing device, and the device's respective user.

Each entry or exit of computing devices 330A-D is identified by home controller 325 and sequentially recorded and stored in information repository 329. Recorded events in information repository 329 allow flexible bandwidth program 125 to analyze the rules in rules engine 327 to determine if a change in bandwidth is required. If flexible bandwidth program 125 determines a change in bandwidth is required, then through API 342A, flexible bandwidth program 125 requests the corresponding bandwidth change. Upon receipt of request, SDN controller 360 recalculates the path for the new bandwidth and provision the same against the household.

Internet provider 150 may publish APIs designed to trigger a change of bandwidth through SDN controller 360 upon a request from flexible bandwidth program 125. For illustration purposes, embodiment 300 depicts API 342A and API 342B. Those skilled in the art will appreciate that APIs 342A and 342B express software components in terms of operations, inputs, outputs and/or protocols etc., which may be independent of the respective implementation, and therefore are depicted for representative purposes only. In the ongoing example, an independent user creates a rule, which activates video camera 370 (which requires an increase in bandwidth) only if there is at least one dependent person within HAN 320 and no independent persons within HAN 320. Upon a successful evaluation of the rule, flexible bandwidth program 125 invokes API 342A.

In the exemplary scenario as depicted in environment 300, upon flexible bandwidth program 125 determining a required change in bandwidth, flexible bandwidth program 125 invokes API 342A to broker application 345. Broker application 345 is an application hosted by Internet provider 150 and may act as a gateway to invoke APIs to change bandwidth. Broker application 345 may be associated with information repository 350. Broker application 345 may have a rule engine (not shown) associated with internet provider 150. Broker application 345 my invoke API 342B to SDN controller 360. SDN controller 360 manages flow control thereby enabling intelligent networking. SDN controller 360 in conjunction with internet provider 150 changes the bandwidth of network 310 to HAN 320 and/or video viewing device 375.

FIGS. 4A and 4B depict a set of rules within rules engine 127, for controlling the quantity of bandwidth provided to computing devices 330A-D from network 310. FIG. 4A illustrates table 400A which is a set of rules/conditions in which, flexible bandwidth program 125 requests an increase or decrease in bandwidth from Internet provider 150. FIG. 4B illustrates table 400B which depicts an exemplary pseudo code for utilizing rules associated with each rule ID of column 440.

Column 410 depicts independent computing devices 330A and 330B as well as dependent computing devices 330C and 330D. Column 420 depicts the location of each respective computing device as being either inside or outside of HAN 320. Column 430 depicts a specific event, where a computing device either enters or exits HAN 320. Column 440 depicts the applicable rule applied to each event of Column 430, for each respective computing device. Columns 442 and 444 of table 400B illustrate an exemplary rule definition in accordance with the ongoing example. Columns 450 and 460 depict the required bandwidth based on the outcome of each respective rule ID.

With reference to FIGS. 4A and 4B, and a change in location of dependent computing devices 300C and/or 330D, flexible bandwidth program 125 may request an increase or decrease in bandwidth. It is appreciated that upon home controller 325 detecting a change of location of either dependent computing device 330C or 330D, then home controller 325 publishes the specific change of location to flexible bandwidth program 125. Responsive to receiving the change of location publication, flexible bandwidth program 125 may request an increase or decrease of bandwidth. For example, if dependent computing device 330C changes location, then flexible bandwidth program 125 first determines if the dependent computing device is currently within HAN 320. If dependent computing device 330C is within HAN 320 and an independent computing device 330A or 330B is also within HAN 320 then no change in bandwidth is required (with reference to the rules associated with FIGS. 4A and 4B). However, if dependent computing device 330C is within HAN 320 and independent computing device 330A or 330B is not within HAN 320, then flexible bandwidth program 125 through an API 342A, requests an increase in bandwidth and to activate video camera 370. Thereafter, SDN controller 360 increases bandwidth. This allows independent computing devices 330A, 330B and/or video viewing device 375 to display a live feed from video camera 370 at a remote location, utilizing the extra bandwidth.

Alternatively, if flexible bandwidth program 125 initially determines that dependent computing device 330C is not currently within HAN 320, then flexible bandwidth program 125 may then determine if there are additional dependent computing devices within HAN 320 (i.e., dependent computing device 330D). If there are additional dependent computing devices within HAN 320 (not shown in FIG. 3, i.e., dependent computing device 330D), then the bandwidth does not change (bandwidth remains on the high level). If, however there are no additional dependent computing devices within HAN 320 (i.e., all dependent computing devices 300C and 300D are outside HAN 320), then flexible bandwidth program 125 through an API, requests a decrease in bandwidth. SDN controller 360 decreases bandwidth to network 310.

Alternatively, referencing FIGS. 4A and 4B, and a change in location of independent computing devices 300A and/or 330B, flexible bandwidth program 125 may request an increase or decrease in bandwidth. It is appreciated that upon home controller 325 detecting a change of location of either independent computing device 330A or 330B, then home controller 325 publishes the specific change of location to flexible bandwidth program 125. Responsive to receiving the change of location publication, flexible bandwidth program 125 may request an increase or decrease of bandwidth. For example, if independent computing device 330A changes location, then flexible bandwidth program 125 first determines if independent computing device 300A is currently within HAN 320. If independent computing device 330A is within HAN 320 and the bandwidth is currently set to high, then flexible bandwidth program 125 through an API, requests a decrease in bandwidth. SDN controller 360 decreases bandwidth, accordingly. However, if independent computing device 330A is within HAN 320 and the bandwidth is currently set to low, then flexible bandwidth program 125 does nothing as the bandwidth is already at the desired low level.

Alternatively, if flexible bandwidth program 125 initially determines that independent computing device 330A is not currently within HAN 320, then flexible bandwidth program 125 may then determine if there are any dependent computing devices within HAN 320 (i.e., dependent computing device 330C and/or 330D). If dependent computing device(s) 330C and/or 330D are not home, then flexible bandwidth program 125 does not request a change in bandwidth. However, if any dependent computing device(s) 330C and/or 330D are within HAN 320, then flexible bandwidth program 125, through an API, requests an increase in bandwidth. SDN controller 360 increases the bandwidth. Flexible bandwidth program 125 may also activate video camera 370. Due to the increase in bandwidth, independent computing devices 330A, 330B and/or video viewing device 375 are now able to view a live feed from video camera 370.

Embodiments of the present invention may be utilized by a multitude of scenarios. FIGS. 3, 4A and 4B illustrate only one such scenario. In one embodiment, computing device 130A is a pulse monitoring device utilized by an elderly individual and computing device 130B is a smart phone utilized by a caretaker. Within this exemplary embodiment, if the caretaker is not within HAN 110 (i.e., caretaker is not near elderly individual) and the pulse monitoring device detects an elevated heart rate, then flexible bandwidth program 125 may request an increase in bandwidth, (based on a rule in rules engine 127) allowing the caretaker to commence a video conversation with the elderly individual. Alternatively, if the caretaker is within HAN 110, and the pulse monitoring device detects an elevated heart rate, based on a rule in rules engine 127, flexible bandwidth program 125 may not request an increase in bandwidth.

In another embodiment, independent computing device 330A and 330B are a pair of parents while dependent computing devices 330C and 330D are children of the aforementioned parents. Within this exemplary embodiment, when independent computing device 330A and 330B (parents) are not within HAN 320, bandwidth may be decreased, to prevent dependent computing devices 330C and 330D (children) from streaming videos over network 310. Therefore, when both independent computing devices 330A and 330B are not within HAN 320, the bandwidth is decreased, and bandwidth is increased when at least one independent computing device 330A and/or 330B is within HAN 320.

Reference is now made to FIG. 5. FIG. 5 is a block diagram of internal and external components of a computer system 500, of FIG. 1, in accordance with an embodiment of the present invention. It should be appreciated that FIG. 5 provides only an illustration of one implementation and does not imply any limitations with regard to the environments in which different embodiments may be implemented. In general, the components illustrated in FIG. 5 are representative of any electronic device capable of executing machine-readable program instructions. Examples of computer systems, environments, and/or configurations that may be represented by the components illustrated in FIG. 5 include, but are not limited to, personal computer systems, server computer systems, thin clients, thick clients, laptop computer systems, wearable computing devices, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computer system 500 includes communications fabric 502, which provides for communications between one or more processors 504, memory 506, persistent storage 508, communications unit 512, and one or more input/output (I/O) interfaces 514. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In this embodiment, memory 506 includes random access memory (RAM) 516 and cache memory 518. In general, memory 506 can include any suitable volatile or non-volatile computer readable storage media. Software (e.g., Flexible Bandwidth Program 125) is stored in persistent storage 508 for execution and/or access by one or more of the respective processors 504 via one or more memories of memory 506.

Persistent storage 508 may include, for example, a plurality of magnetic hard disk drives. Alternatively, or in addition to magnetic hard disk drives, persistent storage 508 can include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 508 can also be removable. For example, a removable hard drive can be used for persistent storage 508. Other examples include optical and magnetic disks, thumb drives, and smart cards that are inserted into a drive for transfer onto another computer readable storage medium that is also part of persistent storage 508.

Communications unit 512 provides for communications with other computer systems or devices via a network. In this exemplary embodiment, communications unit 512 includes network adapters or interfaces such as a TCP/IP adapter cards, wireless Wi-Fi interface cards, or 3G or 4G wireless interface cards or other wired or wireless communication links. The network can comprise, for example, copper wires, optical fibers, wireless transmission, routers, firewalls, switches, gateway computers and/or edge servers. Software and data used to practice embodiments of the present invention can be downloaded to through communications unit 512 (e.g., via the Internet, a local area network or other wide area network). From communications unit 512, the software and data can be loaded onto persistent storage 508.

One or more I/O interfaces 514 allow for input and output of data with other devices that may be connected to computer system 500. For example, I/O interface 514 can provide a connection to one or more external devices 520 such as a keyboard, computer mouse, touch screen, virtual keyboard, touch pad, pointing device, or other human interface devices. External devices 520 can also include portable computer readable storage media such as, for example, thumb drives, portable optical or magnetic disks, and memory cards. I/O interface 514 also connects to display 522.

Display 522 provides a mechanism to display data to a user and can be, for example, a computer monitor. Display 522 can also be an incorporated display and may function as a touch screen, such as a built-in display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
   registering, by one or more processors, at least one computing device, wherein the at least one computing device is associated with a user at a first location, and wherein the at least one computing device utilizes a network bandwidth;
   tracking, by one or more processors, a location of the at least one computing device and usage of the network bandwidth at the location, wherein tracking the location of the at least one computing device further comprises:
      detecting, by one or more processors, whether the at least one computing device is at the first location;
   determining, by one or more processors, whether a change in an amount of the network bandwidth is required, based, at least in part on, a current location of the at least one computing device, an authorization level of the at least one computing device, and a set of rules for governing dependent computing devices associated with the at least one computing device, wherein the set of rules are defined in a pseudo-code format, and wherein the pseudo-code format includes at least in part rule identifications and true-false statements;
   deriving, by one or more processors, patterns of the usage of the network bandwidth;
   responsive to deriving patterns of the usage of the network bandwidth, modifying, by one or more processors, the set of rules governing dependent computing devices associated with the at least one computing device, based on the derived patterns of the usage of the network bandwidth;
   responsive to determining that a change in the amount of the network bandwidth is required, requesting, by one or more processors, said change in the amount of the network bandwidth;
   responsive to requesting said change in the amount of the network bandwidth, executing, by one or more processors, said change in the amount of the network bandwidth by invoking the pseudo-code format; and
   responsive to invoking the pseudo-code format, modifying, by one or more processors, the set of rules governing dependent computing devices associated with the at least one computing device.

2. The method of claim 1, wherein deriving patterns, comprises:
   deriving, by one or more processors, a pattern, based in part on the tracked location of the at least one computing device and the amount of the network bandwidth, wherein the tracked location of the at least one computing device comprises a plurality of recorded indications when the at least one computing device enters and exits the first location; and
   recording, by one or more processors, the derived pattern, based in part on the tracked location of the at least one computing device and the amount of the network bandwidth, as a rule among the set of rules governing dependent computing devices associated with the at least one computing device.

3. The method of claim 1, wherein the at least one computing device comprises at least a first computing device and a second computing device, wherein the first computing device and the second computing device have different authorization levels.

4. The method of claim 3, further comprising:
   determining, by one or more processors, whether a change in bandwidth is required, based, in part, on an authorization level of the at least one computing device, the location of the at least one computing device, and the set of rules.

5. The method of claim 1, wherein tracking the location of the at least one computing device further comprises:
   pairing, by one or more processors, the at least one computing device to a small area network, with a known radius at the first location, wherein the small area network detects whether the at least one computing device is at the first location.

6. The method of claim 1, further comprising:
   providing, by one or more processors, a manual override user interface, wherein the manual override user interface allows the at least one computing device to request a change in network bandwidth, outside the set of rules.

7. The method of claim 1, further comprising:
   responsive to determining the change in the amount of the network bandwidth is required, triggering, by one or more processors, a registered video camera at the first location, wherein triggering the video camera turns the video camera on or off, based on the set of rules.

8. A computer program product comprising:
   a computer readable storage medium and program instructions stored on the computer readable storage medium, the program instructions comprising:
   program instructions to register at least one computing device, wherein the at least one computing device is associated with a user at a first location, and wherein the at least one computing device utilizes a network bandwidth;
   program instructions to track a location of the at least one computing device and usage of the bandwidth at the location, wherein tracking the location of the at least one computing device further comprises:
      program instructions to detect whether the at least one computing device is at the first location;
   program instructions to determine whether a change in an amount of the network bandwidth is required, based, at least in part on, a current location of the at least one computing device, an authorization level of the at least one computing device, and a set of rules for governing dependent computing devices associated with the at least one computing device, wherein the set of rules are defined in a pseudo-code format, and wherein the pseudo-code format includes at least in part rule identifications and true-false statements;
   program instructions to derive patterns of the usage of the network bandwidth;
   responsive to deriving patterns of the usage of the network bandwidth, program instructions modify the set of rules governing dependent computing devices associated with the at least one computing device, based on the derived patterns of the usage of the network bandwidth;
   responsive to determining that a change in the amount of the network bandwidth is required, program instructions to request said change in the amount of the network bandwidth;
   responsive to requesting said change in the amount of the network bandwidth, program instructions to execute said change in the amount of the network bandwidth by invoking the pseudo-code format; and
   responsive to invoking the pseudo-code format, modifying, by one or more processors, the set of rules governing dependent computing devices associated with the at least one computing device.

9. The computer program product of claim 8, wherein program instructions to derive patterns, comprises:
   program instructions to derive a pattern based in part on the tracked location of the at least one computing device and the amount of the network bandwidth, wherein the tracked location of the at least one computing device comprises a plurality of recorded indications when the at least one computing device enters and exits the first location; and
   program instructions to record the derived pattern, based in part on the tracked location of the at least one computing device and the amount of the network bandwidth, as a rule among the set of rules governing dependent computing devices associated with the at least one computing device.

10. The computer program product of claim 8, wherein the at least one computing device comprises at least a first computing device and a second computing device, wherein the first computing device and the second computing device have different authorization levels.

11. The computer program product of claim 10, further comprising:
   program instructions to determine whether a change in bandwidth is required, based, in part, on an authorization level of the at least one computing device, the location of the at least one computing device, and the set of rules.

12. The computer program product of claim 8, wherein the program instructions to track the location of the at least one computing device, further comprise:
   program instructions to pair the at least one computing device to a small area network, with a known radius at the first location, wherein the small area network detects whether the at least one computing device is at the first location.

13. The computer program product of claim 8, further comprising:
   program instructions to provide a manual override user interface, wherein the manual override user interface allows the at least one computing device to request a change in network bandwidth, outside the set of rules.

14. The computer program product of claim 8, further comprising:
   responsive to determining the change in the amount of the network bandwidth is required, program instructions to trigger a registered video camera at the first location, wherein triggering the video camera turns the video camera on or off, based on the set of rules.

15. A computer system comprising:
   one or more computer processors;
   one or more computer readable storage media;
   program instructions stored on the one or more computer readable storage media for execution by at least one of the one or more processors, the program instructions comprising:
   program instructions to register at least one computing device and usage of the bandwidth at the location, wherein the at least one computing device is associated with a user at a first location, and wherein the at least one computing device utilizes a network bandwidth;

program instructions to track a location of the at least one computing device, wherein tracking the location of the at least one computing device further comprises:
    program instructions to detect whether the at least one computing device is at the first location;
program instructions to determine whether a change in an amount of the network bandwidth is required, based, at least in part on, a current location of the at least one computing device, an authorization level of the at least one computing device, and a set of rules for governing dependent computing devices associated with the at least one computing device wherein the set of rules are defined in a pseudo-code format, and wherein the pseudo-code format includes at least in part rule identifications and true-false statements;
program instructions to derive patterns of the usage of the network bandwidth;
responsive to deriving patterns of the usage of the network bandwidth, program instructions modify the set of rules governing dependent computing devices associated with the at least one computing device, based on the derived patterns of the usage of the network bandwidth;
responsive to determining that a change in the amount of the network bandwidth is required, program instructions to request said change in the amount of the network bandwidth;
responsive to requesting said change in the amount of the network bandwidth, program instructions to execute said change in the amount of the network bandwidth by invoking the pseudo-code format; and
responsive to invoking the pseudo-code format, modifying, by one or more processors, the set of rules governing dependent computing devices associated with the at least one computing device.

16. The computer system of claim 15, wherein program instructions to derive patterns, comprises:
    program instructions to derive a pattern based in part on the tracked location of the at least one computing device and the amount of the network bandwidth, wherein the tracked location of the at least one computing device comprises a plurality of recorded indications when the at least one computing device enters and exits the first location; and
    program instructions to record the derived pattern, based in part on the tracked location of the at least one computing device and the amount of the network bandwidth, as a rule among the set of rules governing dependent computing devices associated with the at least one computing device.

17. The computer system of claim 15, wherein the at least one computing device comprises at least a first computing device and a second computing device, wherein the first computing device and the second computing device have different authorization levels.

18. The computer system of claim 17, further comprising:
    program instructions to determine whether a change in bandwidth is required, based, in part, on an authorization level of the at least one computing device, the location of the at least one computing device, and the set of rules.

19. The computer system of claim 15, wherein the program instructions to track the location of the at least one computing device, further comprise:
    program instructions to pair the at least one computing device to a small area network, with a known radius at the first location, wherein the small area network detects whether the at least one computing device is at the first location.

20. The computer system of claim 15, further comprising:
    responsive to determining the change in the amount of the network bandwidth is required, program instructions to trigger a registered video camera at the first location, wherein triggering the video camera turns the video camera on or off, based on the set of rules.

* * * * *